(12) United States Patent
van Gilluwe et al.

(10) Patent No.: US 6,351,850 B1
(45) Date of Patent: Feb. 26, 2002

(54) COMPUTER OPERATING SYSTEM INSTALLATION

(75) Inventors: Frank van Gilluwe, Mountain View, CA (US); Sam Dunham, 2310 Shade Tree La., San Jose, CA (US) 95131; Kerry Krieger, 780 Nandina Ct., Fremont, CA (US) 94539

(73) Assignees: Frank Van Gilluwe; Sam Dunham; Kerry Krieger, all of San Jose, CA (US)

( * ) Notice: Subject to any disclaimer, the term of this patent is extended or adjusted under 35 U.S.C. 154(b) by 0 days.

(21) Appl. No.: 09/191,753

(22) Filed: Nov. 13, 1998

Related U.S. Application Data (60) Provisional application No. 60/065,863, filed on Nov. 14, 1997.

(51) Int. Cl.[7] ............................................. G06F 9/449
(52) U.S. Cl. ............................ 717/11; 717/1; 707/203
(58) Field of Search .................... 717/3, 11, 1; 707/203, 707/204, 511, 104; 713/1, 2; 709/212; 710/20; 714/2, 25, 201, 202, 710, 764

(56) References Cited

U.S. PATENT DOCUMENTS

| | | | |
|---|---|---|---|
| 5,247,683 A | * 9/1993 | Holmes et al. | 709/221 |
| 5,271,018 A | 12/1993 | Chan | 714/710 |
| 5,555,416 A | * 9/1996 | Owens et al. | 717/11 |
| 5,564,040 A | 10/1996 | Kubala | 711/173 |
| 5,592,638 A | 1/1997 | Onodera | 711/6 |
| 5,675,769 A | 10/1997 | Ruff | 711/173 |
| 5,706,472 A | 1/1998 | Ruff | 711/173 |
| 5,715,463 A | * 2/1998 | Merkin | 717/11 |
| 5,887,164 A | * 3/1999 | Gupta | 713/2 |
| 6,066,182 A | * 3/1999 | Wilde et al. | 717/11 |
| 5,892,952 A | * 4/1999 | Seh et al. | 717/11 |
| 6,016,400 A | * 1/2000 | Day et al. | 717/11 |
| 6,023,584 A | * 2/2000 | Barton et al. | 717/11 |
| 6,023,586 A | * 2/2000 | Gaisford et al. | 717/11 |
| 6,029,175 A | * 2/2000 | Chow et al. | 707/104 |
| 6,047,129 A | * 4/2000 | Frye | 717/11 |
| 6,074,434 A | * 6/2000 | Cole et al. | 717/11 |
| 6,094,531 A | * 7/2000 | Allison et al. | 717/11 |
| 6,202,070 B1 | * 3/2001 | Nguyen et al. | 707/104 |
| 6,247,128 B1 | * 6/2001 | Fisher et al. | 713/100 |

OTHER PUBLICATIONS

Hall et al., "A coopearative approach to support software deployment using the software dock", ACM ICSE, pp. 174–183, 1999.*

Sonnewald, "Developing a theory to guide the process of designing information reterival system", ACM SIGIR, pp. 310–317, Jun. 1992.*

Weitzel et al, "Developing knowledgebased system reorganizing the system development life cycle", Comm. of the ACM, vol. 32, No. 4, pp. 482–488, Apr. 1989.*

* cited by examiner

Primary Examiner—Mark R. Powell
Assistant Examiner—Anil Khatri
(74) Attorney, Agent, or Firm—Douglas A. Chaikin; Peninsula IP Group (57) ABSTRACT

Disclosed herein is apparatus and a method of installing a computer operating system on a data storage medium of a computer system. The computer system includes a processor and the data storage medium. The apparatus and method includes reading the data storage medium for a set of storage medium characteristics including the partition boundaries of each existing partition on the data storage medium. An identification of the operating system to be installed on the data storage medium is then received, typically in the form of a user input signal. The installation characteristic set of the identified operating system is then retrieved from an operating system rule database of the computer system, which rule database can contain a set of installation characteristics for each of a plurality of identified operating systems including a space required by each operating system on the storage medium. The read data storage medium characteristic set is compared with the retrieved operating system installation characteristic set. When the two sets differ by one or more characteristics, at least one of the data storage medium characteristics is modified so that the operating system can be installed on the data storage medium. The modifications can, for example, include one or more of moving an existing storage medium partition, resizing an existing storage medium partition, or establishing a new storage medium partition. Following the foregoing preparation of the storage medium, the operating system will typically be installed on the data storage medium.

34 Claims, 4 Drawing Sheets

COMPUTER OPERATING SYSTEM INSTALLATION

RELATED APPLICATION

This application claims the benefit of U. S. Provisional application No. 60/065,863, filed on Nov 14, 1997.

MICROFICHE APPENDIX

An attached Microfiche Appendix forms part of this application, and provides machine language code for an IBM Compatible program which can execute a method of the present invention. Copyright is claimed in the program of the attached Appendix. The copyright owner grants permission to make facsimile copies of the attached Appendix as it appears in the files or records of the Patent Office, but all other rights are reserved.

FIELD OF THE INVENTION

This invention relates to computers and in particular to the installation of a computer operating system on a storage medium of the computer.

BACKGROUND OF THE INVENTION

A typical current computer system is provided with one or more data storage media each of which may be used to store data such as program files and information files including information regarding the storage medium itself, as well as other information on the computer system. Typically, such storage media are optical or magnetic and can include media such as CD-ROM disks. The present invention is concerned with writeable media, such as magnetic disks and writeable optical disks such as digital video and digital versatile disks sometimes referenced as "DVD". In the case of magnetic disks, these typically may either be of a type which is removable and insertable into a drive by hand such as a "floppy" disk or a so-called "fixed drive" or a hard drive.

The computer writes and retrieves data from a storage media, and performs other computer operations, in accordance with an operating system ("OS"). Common operating systems on an IBM PC compatible computer include DOS, WINDOWS 3.1, WINDOWS 95, WINDOWS NT, IBM OS/2, WINDOWS 98, or Solaris. (WINDOWS is a trademark of Microsoft Corp.; IBM and OS/2 are trademarks of IBM Corporation; SUN and Solaris are trademarks of Sun Microsystems, Inc. Other known PC compatible operating systems include Coherent, FreeBSD, Interactive Unix, Linux, LynxOS, Minux, NetBSD, NextStep, OpenStep, SCO Unix, UnixWare, XENIX, NetWare, CTOS, Pick, QNX, THEOS, and CP/M. Different operating systems may use different conventions for accessing a data storage medium and may have different limitations in the size of storage space which they can handle. Because of this, the different operating systems may not be compatible. This can be better understood by reference to FIG. 1 as discussed below.

Figure 1:
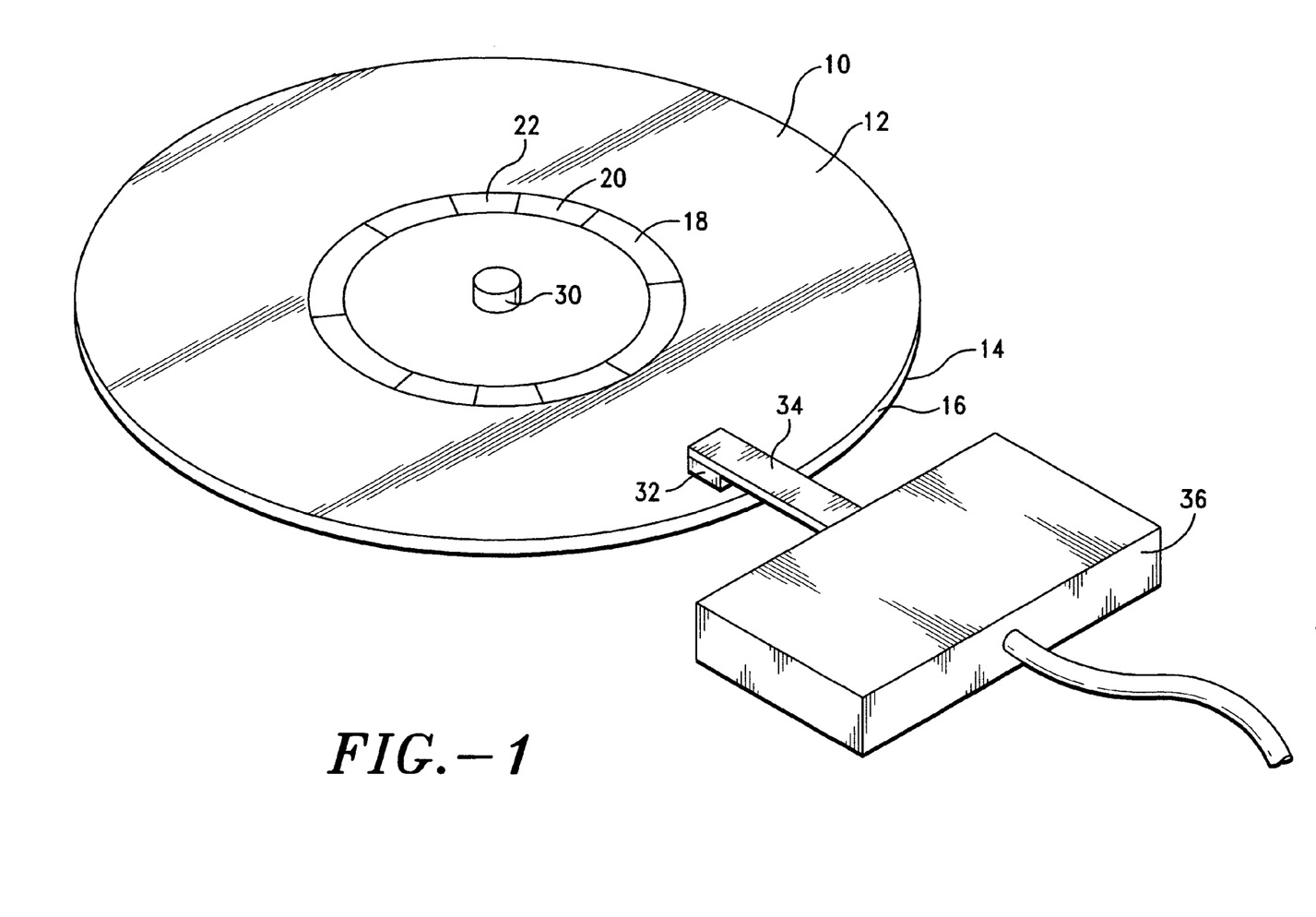
FIG. 1 illustrates a typical computer storage medium such as a storage disk, as described above.

FIG. 1 illustrates a typical conventional magnetic disk which can be either a removable or fixed drive disk. The disk 10 is rotated in a drive by a spindle 30 and data is read from or written onto a first side 12 by means of a read/write head assembly 32 carried on an arm 34. The head assembly 32 is positioned by a motor assembly 36 under the control of a disk controller controlled by commands from the computer processor. Data can also be read from or written onto a second side 14 by means of another read/write head assembly (not shown). Furthermore, in a typical hard drive there will be many such disks 10 with a read/write head positioned on each side, all under control of the same motor assembly 36. However, for simplicity only one side of one disk is shown in FIG. 1. While often a single disk is referenced below in connection with a data storage device, it will be understood that there could in fact be multiple disks.

Each side is typically divided into a series of concentric rings 19 referenced as a cylinder 18 extending down through the disks. The set of rings on all sides of all disks lying on the same imaginary cylinder extending down through the disks have the same cylinder identification.

Each cylinder 18 is further logically divided by a computer operating system into sectors, such as sectors 20, 22 which can be numbered with respect to some reference mark on the disk 10. Each sector of a disk has a unique identification, such as a cylinder number, disk side and sector number. Alternatively, a single sector number can uniquely identify a particular sector in a system where sectors are numbered in a serpentine manner, beginning with the outermost cylinder on an upper side and continuing through the sectors on the same cylinder to the lower disk side. This configuration is continued on the same cylinder of the next disk and repeated for the next inward cylinder and so on until all sectors have been numbered.

Typical computer operating systems designate the space on the disk in a strategy referred to as a partition with the details of the partitioning being recorded on a disk in the form of a "partition table". However, because different operating systems may use different partitioning strategies, a disk partition for one operating system may not be compatible with that of another operating system. A common partition strategy and associated partition table is the IBM compatible partition. This partitioning is found on fixed, removable magnetic and optical disks used in IBM compatible computers and is used, for example, by Microsoft DOS, or WINDOWS versions. IBM compatible partitioning may be used with a variety of disk sector addressing schemes.

Computer system users often wish to add a new operating system to their hard drive or other media which may already carry one or more other operating systems on different partitions. "New" in this context, is meant an operating system not already existing on the storage media, or a copy of an operating system which does already exist on the storage media. However, as is apparent from the above, different operating systems will typically require their own partitions. In the typical case where a user has only one operating system and a corresponding single partition, the user can simply reformat and re-partition the storage medium using the new operating system, and install the new operating system on the storage medium. However, this means all existing data on the storage medium will be lost. To retain existing data, a user can copy all files to a backup storage medium such as multiple floppy disks and then re-install the data. However, this will only work where the new operating system is compatible with the previous file structure.

Furthermore, a user may want to have two or more different operating systems present on the storage medium at the same time, such as when a new operating system is to be installed but the user does not want to abandon an existing operating system until he is sure the new operating system will function efficiently with all existing programs. This will require the user to determine from a user manual of the operating system to be installed, the requirements of that operating system, the existing partition and data structure on the storage medium, and then determine an appropriate way to modify the existing partition and data structure so that the new operating system can be accommodated in its own partition. On a disk containing a number of operating systems and partitions, and having a limited amount of total available space, it can be difficult to arrive at a single way of modifying the existing partition and data structure, to accomplish the objective of adding or deleting a partition. It is far more difficult to optimize the addition or deletion of a partition in terms of minimizing the number of steps required or optimizing the use of disk space.

Additionally, a user may want to install an upgrade version of an existing operating system. Upgrade versions typically look for files belonging to an existing version, for example a WINDOWS 95 upgrade version may look for files belonging to an existing WINDOWS 3.1 version and replace or overwrite these files. This means that the existing operating system is destroyed and a user has no chance to test the new operating system with his existing software without reformatting a drive and re-installing the previously existing operating system and possibly other programs. Furthermore, most users when installing such upgrade versions have no idea that such a procedure may be required since the upgrade versions do not provide warnings of this situation.

Thusly, it would be desirable to provide a method and system by which a new operating system is readily installed on a storage medium having one or more partitions optionally carrying one or more respective operating systems is additionally based upon an existing operating system desirable to provide a method and system which allows a user to readily switch between an upgrade version of an existing operating system and the former version upon installation of the upgrade prior version of the operating system if so desired.

SUMMARY OF THE INVENTION

The present invention provides apparatus for and a method of installing a computer operating system on a data storage medium of a computer system which computer system also includes a processor. The method comprises steps of:

(a) selecting an operating system for installation on the computer system;

(b) reading the data storage medium for a set of data storage medium characteristics including the partition boundaries of each existing partition on the data storage medium;

(c) receiving an identification of the operating system to be installed on the data storage medium;

(d) retrieving the installation characteristic set of the identified operating system from an operating system rule database of the computer system which rule database may, for example, contain a set of installation characteristics for each of a plurality of identified operating systems including a space required by each operating system on the data storage medium;

(e) comparing the read data storage medium characteristic set with the retrieved operating system installation characteristic set and, when the two sets differ by one or more characteristics, modifying at least one of the storage medium characteristics so that the selected operating system can be installed on the data storage medium, the modifying including one or more of moving and resizing an existing storage medium partition, and establishing a new storage medium partition; and (f) installing the operating system on the data storage medium.

The present invention can be used simply for preparing a data storage medium for installation of an operating system using the steps described above other than step (f). However, normally the operating system will actually be installed following the preparation. Furthermore, the present method contemplates that following the comparison step, no modifications may be required, in which case this fact can be indicated to a user, following which the new operating system can be installed.

The received identification or corresponding installation characteristic set for the operating system to be installed, may indicate that the operating system to be installed is an update version of an existing operating system on an existing partition. Such an update version may require one or more files from the existing operating system. In this case, the step of modifying the storage medium characteristics comprises creating a new partition and copying the required files to the new partition prior to installing the operating system in the new partition.

The present invention further provides a computer system having a data storage medium, a processor, and an operating system installation rule database on a storage medium. The rule database contains a set of installation characteristics for each of a plurality of identified operating systems including a space required by each operating system on the data storage medium. Such a computer system optionally also includes a display and a user interface. The computer system is controlled or programmed so as to execute any of the methods of the present invention.

In another aspect of the present invention, there is provided a computer readable storage medium such as a magnetic and optical disks and tape storing computer readable program code for controlling the computer system processor to prepare a storage medium of a computer system to receive an operating system to be installed. The program code, when executed by the computer, controls the computer apparatus such as the computer processor to perform the steps of any of the methods of the present invention. While the computer processor can be controlled by the computer readable storage medium to install the operating system the installation may be typically performed by installation software which normally accompanies the operating system to be installed.

It is thus an advantage of present invention to provide a method and system by which a new operating system can be readily installed on a computer system storage medium which may have one or more partitions optionally carrying one or more respective operating systems.

Additionally, it is an additional advantage of the present invention to provide a method and system for allowing the user to readily switch between different operating systems including different versions of the same operating system installed on the same computer memory media.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein:

FIGS. 5, 6 and 7 are flowcharts illustrating the method of the present invention.

DETAILED DESCRIPTION OF THE INVENTION

In the present embodiment of the invention, it will be understood that a computer includes any programmable device, such as a general purpose digital processor programmable to execute the steps of any of the methods of the present invention. Computer readable storage media can include any machine readable substrate carrying the required code such as magnetic and optical disks, tape and data storage circuits. It will also be understood that a "set" of anything described herein may have one or more elements and that the term "partition" used herein will be used to include logical and primary partitions.

Figure 2:
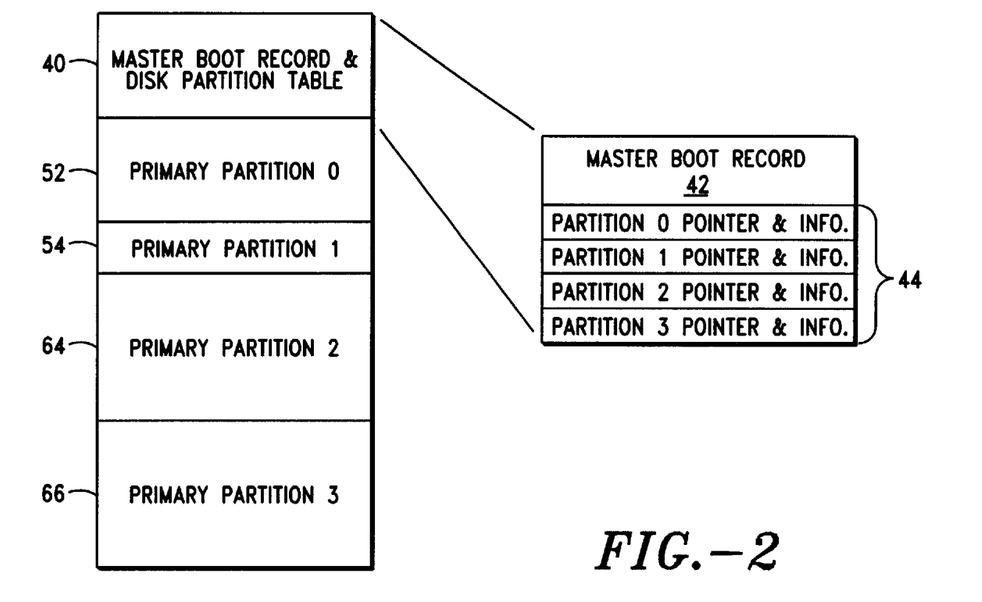
FIGS. 2 and 3 illustrate a typical partition structure as described above.

FIG. 2 illustrates a typical partition structure such as the IBM compatible partition. A first region 40 of the disk carries a Master Boot Record 42. This is the first sector on the hard disk, using a serpentine numbering system such as described above, and normally controls which operating system will be used by the computer. It is to be understood that only one operating system is bootable at any given time. The first region 40 also includes disk partition table which specifies how the hard disk is divided. In IBM compatible partitioning multiple sections, referenced as primary partitions 52, 54, 64, 66, can be set up using the "FDISK" (Format Disk) program. IBM compatible partitioning defines these partitions using a FAT (File Allocation Table) method. Other operating systems can use FAT as well as other partition types such as HPFS (High Performance File System) for OS/2 and NTFS (NT File System) for Windows NT. Different partition types are used for other operating systems such as UNIX and NetWare.

Figure 3:
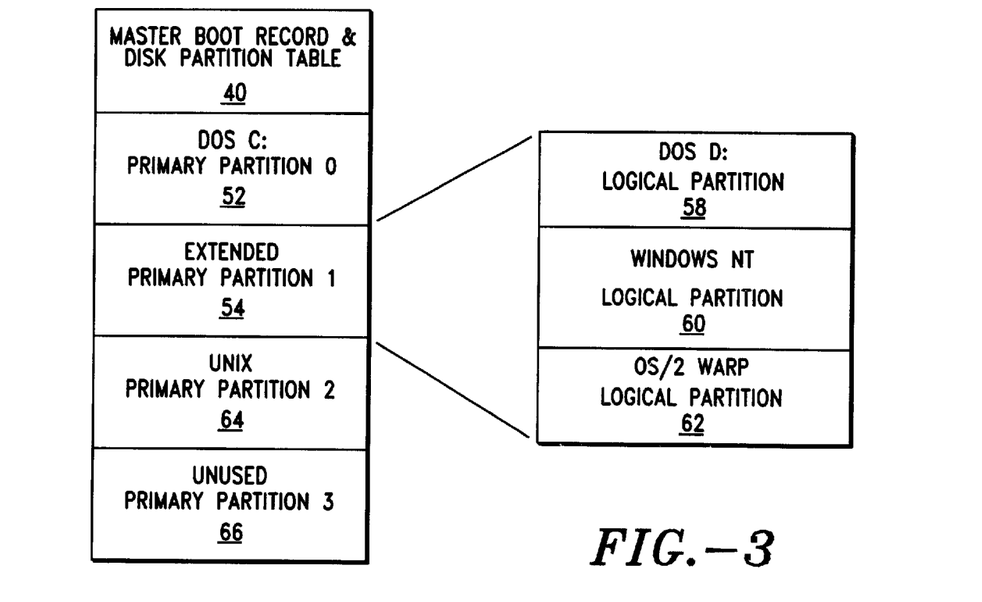

As illustrated in FIG. 3, it is possible to divide a primary partition into smaller logical partitions. A primary partition divided into multiple logical partitions 58, 60, 62 is referenced as an extended partition 54. Some operating systems, such as OS/2 and WINDOWS NT allow a logical partition to be bootable. Details of partition structures and file systems are well known and further information on such structures and partitioning can be found in U. S. Pat. No. 5,371,885 and Chapter Eight of "Advanced MS-DOS: The Microsoft guide for Assembly Language and C programmers", by R. Duncan, ISBN 0-914845-7702, 1986. The foregoing reference by Duncan is incorporated in this application by reference. Partition boundaries can be moved to allow re-sizing or moving of an entire partition.

Figure 4:
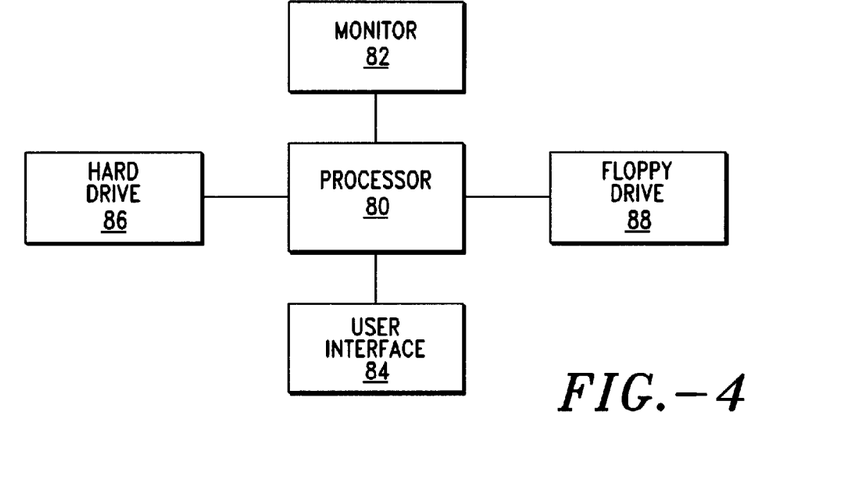
FIG. 4 is a block diagram of a computer system according to the present invention.

Referring to FIG. 4, the illustrated computer system includes a processor 80, a monitor 82 for displaying information to a user as required and a user interface 84. The user interface 84 may be any suitable device such as a keyboard and mouse. A first storage medium in the form of hard drive 86 is provided as well a second storage medium in the form of floppy drive 88 having a floppy disk loaded therein. The hard drive 86 has one or more partitions and may have one or more existing operating systems installed in it. The hard drive 86 further may have the necessary program code installed in it to execute a method of the present invention, in particular the method described below, as well as an operating system rule database 1700, FIG. 5. The rule database 1700 contains installation characteristics for each of a plurality of operating systems identified in the database. Such characteristics for each identified operating system can include information such as minimum space required to install the operating system, whether the operating system uses a partitioning system which is compatible with one or more other operating systems and which can be installed on the same extended partition, a set of file structures with which the operating system is compatible, and whether an identified operating system is an upgrade version.

Figure 5:
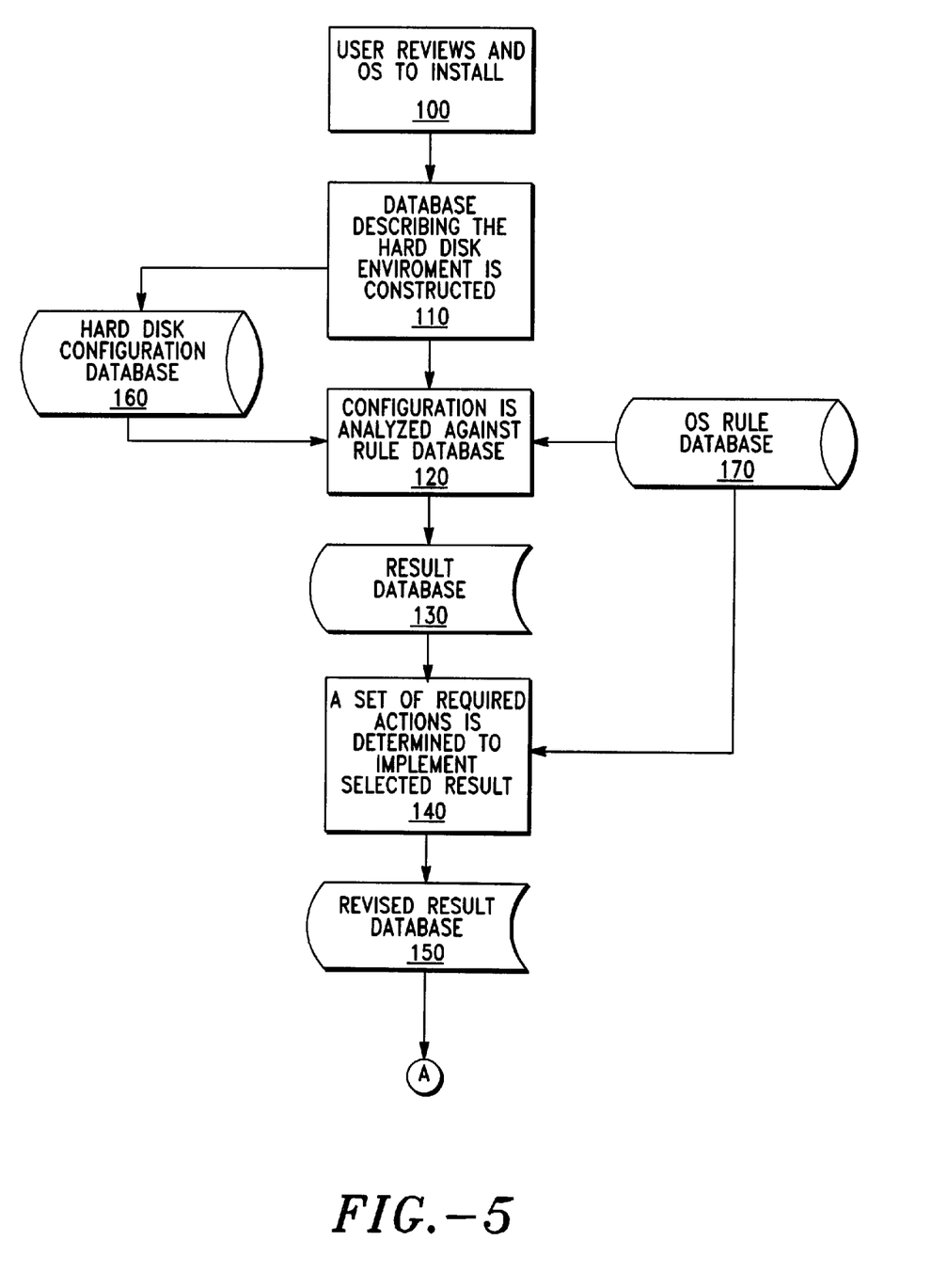
Figure 6:
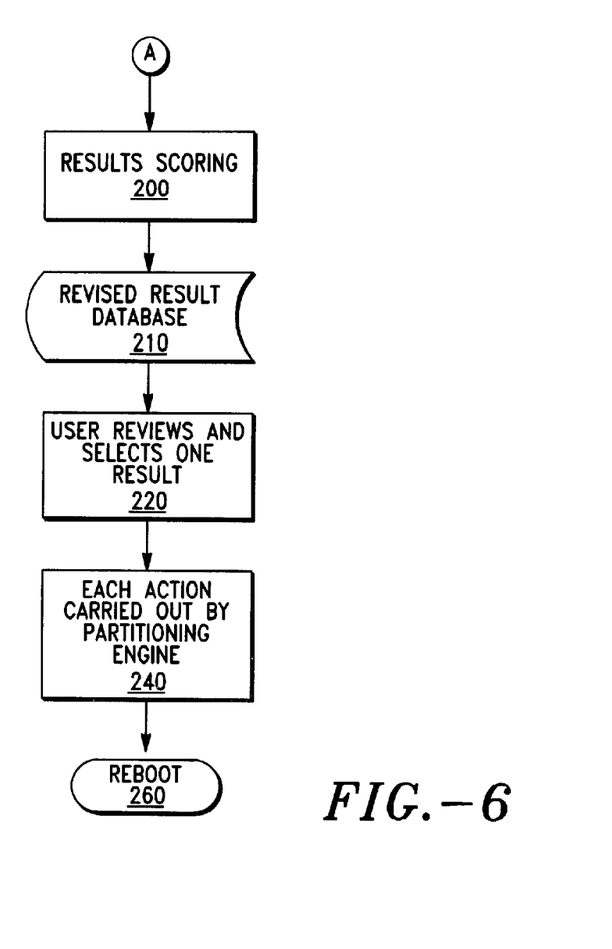

Referring now to FIGS. 5, 6 and 7, a method executed by processor 80 of the computer system which is controlled the program code on the hard drive 86 or floppy drive 88 or a storage medium such as a CD ROM or magnetic tape will now be described. First, step 100, the user selects the new operating system for installation on the computer system by entering the identification of the selected operating system on user interface 84. This may be accomplished, for example, by the user typing in the name of the operating system as provided on a software package, or by selecting from a list of operating systems displayed on the display 82 as obtained from an operating rule database 1700. The processor 80 responds to receipt of the selected operating system identification by reading the data storage medium on hard drive 86, step 105, to obtain a set of data storage medium characteristics (sometimes referenced as hard drive configuration data or environment data) of the hard disk configuration database 1600 on hard drive 86. The read data storage medium characteristics of the hard drive 86 can include: number of disks, number and size of each partition on each disk, the disk geometry (in particular, the number of heads, sectors and cylinders), type of each file system installed in each partition on each disk, the amount of free space in each partition, the operating system (if any) installed in each partition, and location of existing partition boundaries on the drive. From this, a database of the hard drive characteristics is constructed which may either be saved on the hard drive 86 or in solid state random "RAM" (Random Access Memory).

The computer system processor 80, FIG. 4, having received the identification of the selected operating system, step 110, retrieves the installation characteristics of the identified operating system, step 115, from the operating system rule data base 1700 wherein is stored a set of installation characteristics of each of a plurality of operating systems including the space required by each of the operating systems stored on the data storage medium. Next, the computer system processor 80, step 120, is controlled to compare and analyze the data storage medium characteristics read from the hard disk configuration database 1600 against the installation characteristics of the identified operating system retrieved from the operating system rule database 1700. Procedural code is used to determine if a method is possible.

If the processor 80 in making the comparison determines that there are no set differences, step 125, then the selected new operating system is installed on hard drive 86, step 195. When it is determined that there are differences between the read data storage medium characteristic set and the retrieved operating system installation characteristic set, the method determines if the selected or new operating system is an update of an existing operating system, step 130, and if the update operating system requires files from the existing older version of the operating system, step 135. If the update operating system 35 does not require files from the existing operating system, the new update version of the operating system is installed on hard drive 86, step 195. When if is determined that the new update version of the operating system requires files from the existing operating system, step 135, the computer system processor 80 is controlled to create the appropriate new partitions in hard drive 86, step 137. As set forth in step 138, the required files from the existing operating system partition are copied into the created new partitions and the update version of the new operating system, step 195, is installed in the new partitions of the hard drive 86.

If in step 140, it is determined that there is a predetermined critical characteristic difference between the read set of data storage medium characteristics in the database 1600 and the retrieved installation characteristics of the identified operating system to be installed, the user, step 1400, is alerted to this such as by an audio warning or visual warning on the computer system display monitor 82. Such a critical difference may be, for example, that the available space on the disk drive 86 is less than a minimum space required by the operating system to be installed, as provided by the operating system rule database 1700. Alternatively, there may be sufficient total space on the hard disk 86, but available space minus a required space for a partition having an incompatible operating system, is less than the predetermined minimum space for the operating system to be installed. However, in the method of FIGS. 5, 6 and 6, deleting data or programs is an allowed option which is included in the result elements database (that is, the various possible methods).

When it is determined that there is a difference between the read data storage medium characteristics and the retrieved installation characteristics of the identified operating system by a predetermined critical characteristic, the computer processor 80 is controlled, steps 145 and 150, to determine strategies and display the strategies to the computer system user. The strategies may be a set of required actions determined by the processor 80 to implement each of the result elements in the result database. The set of actions for each result element in the result database are stored as the revised result database. Such actions, which are selected by the user, step 155, may include one or more manipulations to modify the storage characteristics environment of hard disk 86, step 160, to prepare it for installation of the new operating system. For example, one result element may include changing the size of or resizing an existing partition, step 165, establishing or creating a new partition in the resulting free space, step 170, formatting the new partition to the proper file system and marking that partition as the installation target. Other actions are possible. For example, actions may include moving an existing partition, including moving data within that existing partition. Suitable methods for moving or re-sizing partitions, copying data therein, and while providing for power failure during such operations, are known, see for example, "Partition Resizer" v. 1.1.1 Program Manual and Technical Information, copyright Zeleps 1994–1995. The numerical values for each action in each result element can be calculated during the operation of the method set forth in FIGS. 5, 6 and 7.

Since there will generally be more than one way of installing a new operating system on the hard disk 86, that is, there will generally be more than one result element in the revised result database, each possibility is scored according to predetermined criteria that weigh the desirability of each method. For example, a method that uses free space to install a new operating system will be given a higher score than one which requires resizing an extended partition smaller to make room for a new partition. The resulting method with the highest score, or a predetermined number of methods with the highest scores, are retained in the revised result database. This may be accomplished, for example, by simply deleting other methods from the result database. One or more of these methods may then optionally be displayed, steps 175 and 180, as a general list of modifications in ranked order along with an indication of one or more steps involved in a list of one or more steps of each method, on the display 82 for a user's review and selection. Alternatively, the method could provide for automatic execution of the highest ranked method without user input. Following a receipt on an user's affirmed selection signal, step 185, on the user input 84, the modifications and actions required on the hard disk 86 by the selected method are performed and executed, step 190. As described above, such actions may include one or more of: adding a new partition, creating a new partition, deleting a partition, changing the size of an existing partition, formatting a partition, changing a partition type, copying files from one partition to another, deleting files in a partition, and marking a partition as an installation target. Following step 190, the system may either automatically reboot or an indication for reboot may be displayed on the display 82 and the computer rebooted after receipt of a user indication to reboot. Following this, step 195, the user can then install the new operating system in accordance with the installation software typically accompanying such new operating system.

The program for the above method may have an initial portion executing from the Master Boot Record of the storage medium, with a pointer to another location on the disk where the remainder of the program is stored. In addition, while the various databases referenced in the above method may be stored in ROM or the disk drive 86 or another storage medium, it may be useful to store a copy of at least the revised result database on the disk drive 86 or some other drive, which copy is marked at each step of the modification of the disk drive 86, to aid in recovery and completion of the disk drive modifications in the event of a power failure.

In a particular case, the operating identification of the operating system to be installed, which is received from the user through the interface 84, may either by itself or with information from the rule database 170, indicate that the new operating system is an upgrade version. Such upgrade versions require one or more files from a prior version of the operating system which must already exist on the hard disk 86. In this case, hard disk configuration database 1600 is checked during comparison step 120 for the existence of the prior version of the operating system on the hard disk 86. If the prior version does not exist on hard disk 86, a user alert is provided and the program terminates. If the prior version does exist, the preferred, or optionally the only, method in the database 1600 will be to copy the partition and at least those files required by the update version as indicated by the operating system rule database 1700 to a new partition. Alternatively, all of the files, or as many of the files as possible as can be accommodated in the new partition, with priority to required files, may be copied from the prior version partition, including both program and user files, to the new partition, which new partition is then marked for installation of the update version of the operating system. In this manner, a user has the option of using the update version of the operating system and, if dissatisfied for any reason, can readily temporarily or permanently return to the prior operating system version without having to follow complicated disk re-formatting procedures. As discussed above, different operating systems can be set as bootable as desired usually by selections made in a computer's Basic Input/Output System or "BIOS", through an appropriate program provided in Read Only Memory of the computer.

Variations and modifications to the above described invention are, of course, possible. Accordingly, the present invention is not limited to the particular embodiments described above.

What is claimed is:

1. A method of installing an operating system on a data storage device of a computer system wherein the method comprises the steps of:

selecting an operating system for installation on the computer system wherein the operating system is a software platform that schedules tasks, manages storage, controls the communications between peripherals and runs other programs referred to as applications;

reading a plurality of storage characteristics of the data storage device to determine number, size and boundaries of the existing partitions on the data storage device;

identifying the selected operating in an installation rules database on the computer system wherein the installation rules database contains an installation characteristics and rule set for each of the operating systems residing in the database;

retrieving an installation characteristic and rules set for the selected operating system from installation rules database of the computer system, wherein the installation characteristic and rules set including the characteristics and rules, including the size and boundary requirements of a partition required to install the selected operating system on the data storage device properly;

comparing storage characteristic of the data storage device with the retrieved installation characteristics and rule set;

modifying the size and boundaries of a partition so that the selected operating system can be properly installed on the data storage device, if the two sets differ by one or more of the characteristics wherein the modification can include moving one or more of an existing partition, resizing an existing partition, and establishing a new partition; and installing the selected operating system on to the data storage device.

2. The method according to claim 1, wherein the storage characteristics set additionally includes identifying an operating system a file structure present in each partition, and available space in each partition wherein the operating system installation characteristics and rule set additionally includes a file structure with which the operating system is compatible.

3. The method according to claim 1, wherein the steps of comparing, modifying, resizing, and establishing additionally includes steps of relocating data into at least one moved and resized partition.

4. The method according to claim 1, wherein following the step of comparing the storage characteristics of the data storage device with the retrieved installation characteristics and rule set of the operating system, steps of generating a list of the modifications to be made to at least one of the partitions of the data storage device, displaying the list of modifications to be made, and making the modifications upon receipt of a user affirmation signal are performed.

5. The method according to claim 1, wherein when the storage characteristics of the data storage device and the identity of the selected operating system or the retrieved installation characteristics and rule set for the operating system to be installed indicates that the selected operating system to be installed is an updated version of the operating system that already exists in an existing partition on the data storage device and where one or more files are required from the existing operating system performs the steps of comparing, modifying, resizing, creating a new partition, copying the required files to the new partition and installing the operating system in the new partition.

6. The method according to claim 1, wherein when the storage characteristics of the data storage device and the identity of the selected operating system or the retrieved installation characteristics and rule set for the operating system to be installed indicates that the selected operating system to be installed is an updated version of the operating system that already exists in an existing partition on the data storage device and where one or more files are required from the existing operating system performs the steps of comparing, modifying, resizing, creating a new partition, copying all the files to the new partition and installing the operating system in the new partition.

7. The method according to claim 1 further comprises a step of alerting a user when the two sets differ by at least one predetermined storage characteristic.

8. The method according to claim 1, wherein a step of determining a strategy for modifying number, size and boundaries of partitions of the data storage device storage device based on a set of predetermined weighting factors and parameters required to install the operating system properly installed prior to modifying the storage characteristics of the data storage device is performed.

9. The method according to claim 8, wherein prior to modifying the storage characteristics of the data storage device performing the steps of:

determining the priority and rank of the each strategy for modifying the partitions of the data storage device based on the predetermined weighting factors and parameters of each strategy; and displaying the priority and rank of the each strategy for modifying the partitions of the data storage device in accordance with the strategy that corresponds a selection made by a user.

10. The method according to claim 8, wherein a critical characteristic is calculated by subtracting the minimum space requirement needed to properly install the operating system from the total available space on the data storage device.

11. The method according to claim 8, wherein a critical characteristic is the difference between the magnitude of available space on the data storage device and the size of the partition used for an incompatible existing operating system less than the predetermined minimum space required for the operating system to be installed.

12. The method according to claim 1, wherein the data storage device can be either a magnetic or a optical disk drive.

13. The method according to claim 1, wherein the selection of the operating system to be installed is result of a signal received from a user interface.

14. The method according to claim 1, wherein the installation rules database is present on the data storage device onto which the operating system is installed.

15. A computer system that installs an operating system on a data storage device of a computer system comprising:

program logic configured to select an operating system for installation on the computer system wherein the operating system is a software platform that schedules tasks, manages storage, controls the communications between peripherals and runs other programs referred to as applications;

program logic configured to read a purality of storage characteristics to determine number, size and boundaries of the existing partitions on the data storage device;

program logic configured to identify the selected operating in a installation rules database on the computer system wherein the installation rules database contains an installation characteristics and rule set for each of the operating systems residing in the database;

program logic configured to retrieve the installation characteristics and rule set for the selected operating system from installation rules database on the computer system, wherein the installation characteristics and rule set consisting of the characteristics and rules, including the size and boundary requirements of the partition required to install the selected operating system on the data storage device properly;

program logic configured to compare storage characteristic of the data storage device with the retrieved installation characteristics and rule set when the two sets differ by one or more predetermined characteristics, modify at least one of the storage medium characteristics so that the identified operating system can be installed on the data storage medium, the modification including one or more of moving an existing storage medium partition, resizing an existing storage medium partition, and establishing a new storage medium partition; and program logic configured to modify the size and boundaries of a partition so that the selected operating system can be properly installed on the data storage device, if the two sets differ by one or more of the characteristics wherein the modification can include moving one or more of an existing partition, resizing an existing partition, and establishing a new partition; and program logic configured to install the selected operating system on to the data storage device.

16. The computer system according to claim 15, wherein the program logic configured to install an operating system additionally includes the program logic configured to relocate data in a moved and resized partitions.

17. The computer system according to claim 15, wherein the program logic configured to read the storage characteristic additionally includes program logic configured to identify an operating system in each partition, identify the file structure and the available space present in each partition; and program logic configured to retrieve the installation characteristics and rule set of the identified operating system to be installed additionally includes program logic configured to retrieve a file structure that is compatible with the identified operating system from the installation rules database.

18. The computer system according to claim 15, wherein the program logic is configured to compare the storage characteristic of the data storage devices with the retrieved installation characteristics and rule set of the identified operating system, also generates a list of the modifications to be made to the data storage device, displays the list of modifications, and makes the modifications upon receipt of affirmation signal from a user.

19. The computer system according to claim 15, wherein the computer system is additionally programmed to generate a user alert when the two installation characteristic sets differ by a predetermined critical characteristic wherein when the storage characteristics of the data storage device and the identity of the selected operating system or the retrieved installation characteristics and rule set for the operating system to be installed indicates that the selected operating system to be installed is an updated version of the operating system in an existing partition on the data storage device and where one or more files are required from the existing operating system the program logic is configured to compare, modify, resize, create a new partition, copy the required files to the new partition and install the operating system in the new partition.

20. The computer system according to claim 15, wherein when the storage characteristics of the data storage device and the identity of the selected operating system or the retrieved installation characteristics and rule set for the operating system to be installed indicates that the selected operating system to be installed is an updated version of the operating system that already exists in an existing partition on the data storage device and where one or more files are required from the existing operating system the program logic is configured to compare, modify, resize, create a new partition, copy all of the files to the new partition and install the operating system in the new partition.

21. The computer system according to claim 15, wherein the program logic is configured to generate a user alert when the two installation characteristic sets differ by at least one predetermined storage characteristic.

22. The computer system according to claim 15, wherein the program logic is configured to determine a strategy for modifying number, size and boundaries of partitions of the data storage device storage device based on a set of predetermined weighting factors and parameters required to install the operating system properly installed prior to modifying the storage characteristics of the data storage device is performed.

23. The computer system according to claim 22, wherein prior to modifying the storage characteristics of the data storage device performing programmed logic of the computer system is configured to:

determine the priority and rank of the each strategy for modifying the partitions of the data storage device based on the predetermined weighting factors and parameters of each strategy; and display the priority and rank of the each strategy for modifying the partitions of the data storage device in accordance with the strategy that corresponds a selection made by a user.

24. A computer program product comprising:

a computer readable medium carrying computer readable code embodied therein for preparing a data storage device of a computer system to receive the installation of an operating system, and when the code is loaded into a computer system having the data storage device and a processor, causes the processor to perform the steps of:

reading a purality of storage characteristics to determine number, size and boundaries of the existing partitions on the data storage device;

identifying the selected operating in a installation rules database on the computer system wherein the installation rules database contains an installation characteristics and rule set for each of the operating systems residing in the database;

retrieving an installation characteristic and rules set for the selected operating system from installation rules database of the computer system, wherein the installation characteristic and rules set consisting of the characteristics and rules, including the size and boundary requirements of the partition required to install the selected operating system on the data storage device properly;

comparing storage characteristic of the data storage device with the retrieved installation characteristics and rule set;

modifying the size and boundaries of a partition so that the selected operating system can be properly installed on the data storage device, if the two sets differ by one or more of the characteristics wherein the modification can include moving one or more of an existing partition, resizing an existing partition, and establishing a new partition; and installing the selected operating system on to the data storage device.

25. The computer program product according to claim 24 wherein, the storage characteristics set additionally includes identifying an operating system a file structure present in each partition, and available space in each partition wherein the operating system installation characteristics and rule set additionally includes a file structure with which the operating system is compatible.

26. The computer program product according to claim 24 wherein, following the step of comparing the storage characteristics of the data storage device with the retrieved installation characteristics of the operating system, steps of generating a list of the modifications to be made to at least one of the partitions of the data storage device, displaying the list of modifications to be made, and making the modifications upon receipt of a user affirmation signal are performed.

27. The computer program product according to claim 24 wherein, wherein when the storage characteristics of the data storage device and the identity of the selected operating system or the retrieved installation characteristics and rule set for the operating system to be installed indicates that the selected operating system to be installed is an updated version of the operating system that already exists in an existing partition on the data storage device and where one or more files are required from the existing operating system performs the steps of comparing, modifying, resizing, creating a new partition, copying all the files to the new partition and installing the operating system in the new partition.

28. A computer-readable medium of instructions for installing a computer operating system on a computer system having a data storage medium and an operating system rule data base having a set of installation characteristics for each of a plurality of operating systems including a space required by each operating system on the data storage medium, wherein the computer-readable medium instructions comprise:

means for reading a purality of storage characteristics to determine number, size and boundaries of the existing partitions on the data storage device;

means responsible to a user identification of an operating system to be installed on the data storage device for retrieving the installation characteristics and rule set of the identified operating system from the installation rules database of the computer system;

means for comparing storage characteristic of the data storage device with the retrieved installation characteristics and rule set; when the two sets differ by one or more characteristics, modifying at least one of the storage medium characteristics so that the selected operating system can be installed on the data storage medium, the modification including one or more of moving an existing storage medium partition, resizing an existing storage medium partition, and establishing a new storage medium partition;

means for modifying the size and boundaries of a partition so that the selected operating system can be properly installed on the data storage device, if the two sets differ by one or more of the characteristics wherein the modification can include moving one or more of an existing partition, resizing an existing partition, and establishing a new partition; and means for installing the selected operating system on to the data storage device.

29. A computer-readable medium of instructions for installing a computer operating system on a computer system having a processor, display, data storage medium and an operating system rule data base having a set of installation characteristics for each of a plurality of identified operating systems including a space required by each operating system on the data storage medium, wherein the computer-readable medium instructions comprise:

controlling means for enabling the computer processor to:

read a plurality of storage characteristics to determine number, size and boundaries of existing partitions on the data storage device;

identify the selected operating in a installation rules database on the computer system wherein the installation rules database contains an installation characteristics and rule set for each of the operating systems residing in the database;

retrieve an installation characteristic and rules set for the selected operating system from installation rules database of the computer system, wherein the installation characteristic and rules set consisting of the characteristics and rules, including the size and boundary requirements of the partition required to install the selected operating system on the data storage device properly;

compare storage characteristic of the data storage device with the retrieved installation characteristics and rule set;

modify the size and boundaries of a partition so that the selected operating system can be properly installed on the data storage device, if the two sets differ by one or more of the characteristics wherein the modification can include moving one or more of an existing partition, resizing an existing partition, and establishing a new partition; and install the selected operating system on to the data storage device.

30. The computer-readable medium as set forth in claim 29 wherein the controlling means enable the computer processor to:

identify the operating system, available space and a file structure present on each partition of the data storage device; and retrieve a file structure from the installation database that is compatible with the operating system being installed.

31. The computer-readable medium as set forth in claim 29 wherein following the compare of the read data storage medium characteristic set with the retrieved operating system installation characteristic set, the controlling means enable the computer processor to:

generate a list of the modifications to be made to the storage characteristics of the data storage device;

display at least one of the modifications on the list on the computer system display; and perform the modifications upon receipt of a user affirmation signal.

32. The computer-readable medium as set forth in claim 29 wherein when the storage characteristics of the data storage device and the identity of the selected operating system or the retrieved installation characteristics and rule set for the operating system to be installed indicates that the selected operating system to be installed is an updated version of the operating system that already exists in an existing partition on the data storage device and where one or more files are required from the existing operating system, the controlling means enables the computer processor to create a new partition and copy the required files to the new partition and install the operating system in the new partition.

33. The computer-readable medium as set forth in claim 29 wherein the controlling means enable the computer processor to generate a user alert when the two installation characteristic sets differ by at least one predetermined storage characteristic.

34. The computer-readable medium as set forth in claim 29 wherein prior to modifying the storage characteristics of the data storage device, the controlling means enable the computer processor to:

determine a strategy for modifying number, size and boundaries of partitions of the data storage device storage device based on a set of predetermined weighting factors and parameters required to install the operating system properly on a data storage device.

* * * * *